Aug. 18, 1964 R. C. PARKINSON 3,145,359
HELICAL BOURDON TUBE PRESSURE POTENTIOMETER
Filed April 13, 1964 2 Sheets-Sheet 2

INVENTOR.
ROBERT C. PARKINSON
BY

United States Patent Office 3,145,359
Patented Aug. 18, 1964

3,145,359
HELICAL BOURDON TUBE PRESSURE
POTENTIOMETER
Robert C. Parkinson, Riverside, Calif., assignor to
Bourns, Inc., a corporation of California
Filed Apr. 13, 1964, Ser. No. 359,144
7 Claims. (Cl. 338—40)

The invention hereinafter disclosed pertains to pressure potentiometers of the type using a helical Bourdon tube as a pressure-sensitive cell, and like instruments. More particularly, the invention relates to means for supporting and damping movements of the Bourdon tube whereby the electrical performance of the potentiometer in environments of vibration and/or high acceleration is much improved.

It is known in the art to anchor one end of a helical Bourdon tube to a pressure fitting or base, whereby the other or "free" end of of the tube moves in response to change in the differential between the pressures at the interior and the exterior of the tube, and further, to constrain the free end of the tube to rotational motion in a plane by means including a bearing. Thus a potentiometer wiper may be directly connected to the free end of the Bourdon tube and caused to accurately brush an arcuate resistance element and furnish an electrical signal representative of the noted pressure differential. An example of the general class or type of devices here of interest and known in the art is illustrated in U.S. Patent 2,932,807. The prior art devices of the noted class used, for example, ball bearing means supported by fixed means and carrying an arm or the like to which the free end of the helical Bourdon tube was attached and which, with the Bourdon tube, supported a potentiometer wiper, for example. Further, rotational movements of the rotatable portions of the instrument were damped only to whatever extent might be afforded by the fluid in which the tube, etc., was immersed, and hence damping was not only beyond practical control but not satisfactorily effective in many instances. Additionally, the ball or other bearing means were subject to rapid wear and failure when the instrument was employed in an environment of vibration, and were expensive and difficult to install.

The present invention provides means, in the noted type of instrument, whereby the expense and difficulties and other bad features of the noted bearing means are obviated and whereby damping of movements of the operating components of the transducer are uniform and controllable; and concurrently the instrument is made less expensive to manufacture and is more accurate and less susceptible to damage and derangement. Those improvements the invention accomplishes by providing as part of the rotatable structure a rotatable member, for example a sleeve, that presents an elongate cylindrical surface that has close rotational clearance with a fixed or stationary device that preferably is a cylindrical stud but which may be other means providing a concentric cylindrical surface, the annular space between the two cylindrical surfaces being filled with oil or the like whereby an effective substitute for the previously-used bearing is provided and whereby damping is provided by the viscosity of the oil or like fluid. By using appropriate clearance dimensions, and by providing one or more grooves between the two relatively rotating members and choosing grooves of appropriate dimensions relative to other dimensions of the structures, damping effects are readily controlled as to value. In an exemplary structure the rotatable cylinder to which the free end of the helical Bourdon tube is secured is made captive by suitable retaining means that except in abnormally extreme situations such as in shock, are out of contact with the rotatable member, whereby under normal circumstances there is no significant metal-to-metal frictional contact other than the potentiometer contact with the element, to adversely affect accuracy of the instrument and whereby even under shock conditions of acceleration the wiper contact of the potentiometer is maintained in substantially uniform brushing contact with the potentiometer resistance element.

The preceding brief general description of basic concepts of the invention makes it evident that the principles thereof are applicable to many forms of helical Bourdon tube instruments and especially to helical Bourdon tube pressure potentiometers, and that it is a principal object of the invention to provide novel improvements in such instruments.

An additional object of the invention is to provide a helical Bourdon tube instrument with substantially precise guidance for the free end of the Bourdon tube without metal-to-metal bearing contact.

Another object of the invention is to provide an inexpensive substantially frictionless bearing means for the free end of the Bourdon tube of a Bourdon tube pressure transducer.

Another object of the invention is to provide a helical Bourdon tube pressure potentiometer characterized by extremely low friction and vibration error.

Another object of the invention is to provide a helical Bourdon tube pressure transducer having accurate movement-damping means.

Other objects and advantages of the invention will be made evident in the following detailed description of a preferred exemplary instrument according to the invention or will be set out in the appended claims, the preferred exemplary instrument being illustrated in the accompanying drawings in which:

Figure 1:
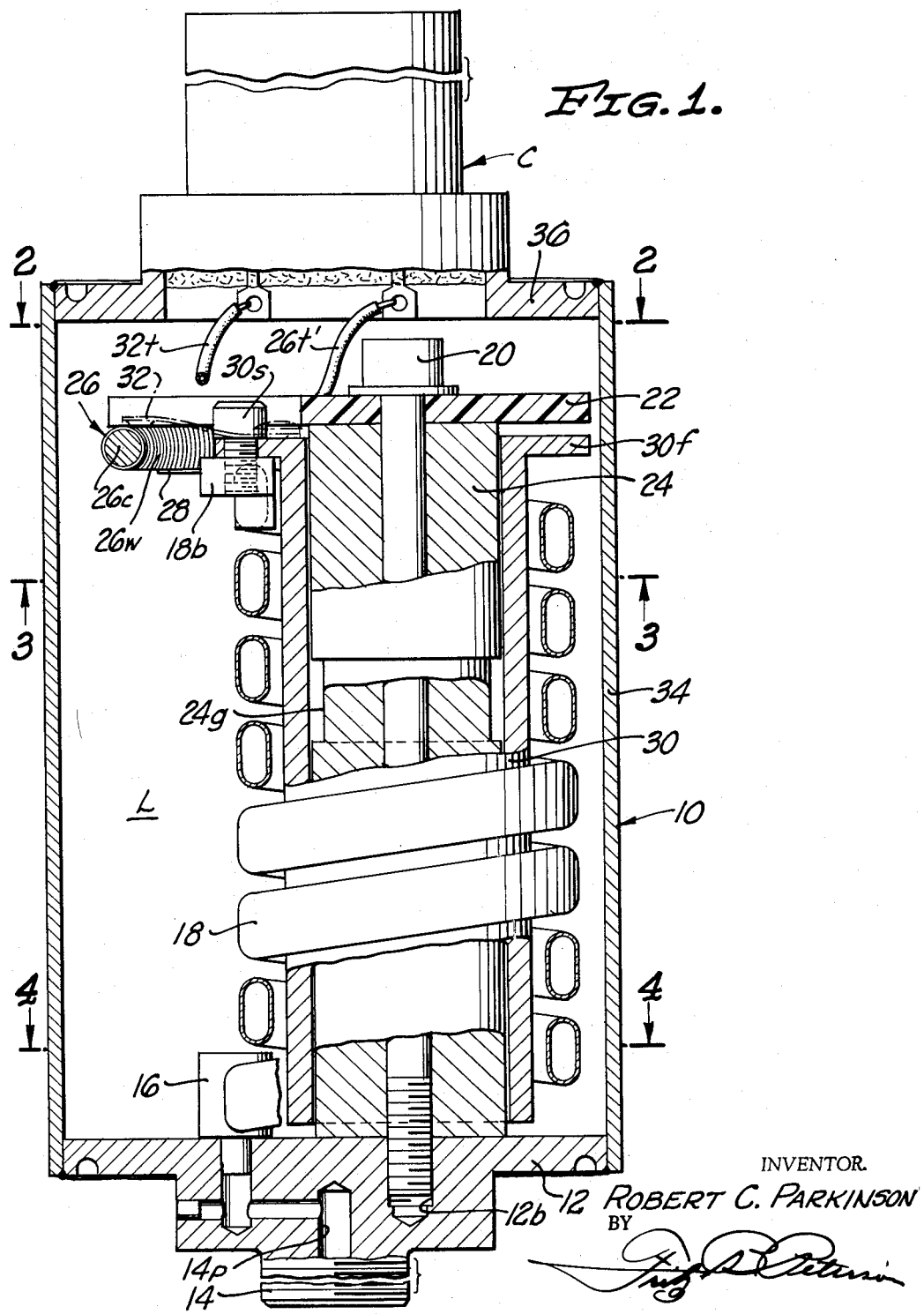
FIGURE 1 is a view in elevation, partly sectional, to a grossly enlarged scale, of the aforenoted exemplary helical Bourdon tube pressure potentiometer, certain of clearances between relatively-moving parts being exaggerated to facilitate illustration.

Referring now to the drawings and to FIGURE 1 in particular, the exemplary instrument, denoted generally by ordinal 10, comprises a housing including a base 12 in the form of a circular plate-like portion attached to or formed integral with a pressure fitting 14 adapted for connection to a conduit via which fluid under pressure is admissible to the fitting. A passage 14p formed through the fitting extends through base 12 and into a pedestal 16. The lower (fixed) end of a helical Bourdon tube 18 is welded or otherwise secured and sealed to pedestal 16 with the interior of the tube in communication with the noted passage 14p. Thus the pressure exhibited in fluid admitted to fitting 14 is evidenced along the interior of the Bourdon tube, the upper (movable) end of which is sealed as by brazing or other means as may be known in the art. The Bourdon tube is preferably made of strong resilient material, and may be of a commercial alloy marketed under the trade name "Ni-Span C"; and the other enumerated parts may be of stainless steel, for example.

The components thus far enumerated and specifically described may be of various forms, sizes and materials and are generally known in the art. According to the invention there is firmly affixed to base 12 as by means of a through-bolt 20 and a cap 22, a stationary elongate cylindrical member or support 24 that serves multiple functions as a bearing member, as a damper member, and as a support. As is evident, support 24 defines a longitudinal axis; and as indicated, has a longitudinal bore therethrough for accommodation of the through-bolt 20. As is also evident, when bolt 20 is tightened into the tapped bore 12b provided therefor in base 12, cap 22 is held fixedly to support 24 and the latter in turn is held fixedly to base 12.

Cap 22 (FIGURE 2) is formed as a generally circular plate with a portion removed to form a wide deep notch 12m. The cap is adapted to fixedly support one of the two active electrical components of the potentiometer, namely, the wiper contact or the resistance element. As depicted and as preferred for reasons obvious to those skilled in the art, the cap 22 is used, among other purposes, to support the potentiometer resistance element 26. The resistance element may be of any of the several types known in the art but as shown is a wire-wound element comprising an arcuate cylindrical core 26c upon which are disposed convolutions of resistance wire 26w (FIGURE 1). As is indicated in FIGURE 3, resistance element 26 is firmly attached to cap 22 by means of clamps 28 and screws 28', preferably supplemented by resin adhesive. The resistance element has an exposed arcuate contact zone disposed for wiping or brushing electrical contact with the potentiometer wiper contact presently described, and has first and second insulated terminal leads such as 26t and 26t' (FIGURES 1 and 2) the conductors of which are welded to respective ends of the resistance wire 26w and to respective electrical connector lugs provided in a sealed plug-connector C (FIGURE 1) provided at the end of the instrument case opposite pressure fitting 14.

Disposed in concentric and coaxial relationship to the cylindrical support 24 and very closely spaced radially thereof is the cylindrical surface of an elongate movable member in the form of a cylinder 30 (FIGURE 1) that at the upper end (as illustrated) is provided with a preferably integral annular flange 30f. The Bourdon tube 18 is disposed in generally concentric relationship with respect to the aforementioned movable cylinder 30 and the concentric or coaxial cylindrical surface of the fixed cylinder (support) 24, as indicated in FIGURE 1. The upper, sealed, end of the Bourdon tube is secured as by welding to a block 18b, and block 18b is in turn secured to movable cylinder 30 as by being attached thereto by a cap screw 30s. Thus the upper (free) end of the Bourdon tube is constrained to rotary motion about the defined axis with movable cylinder 30, and to such movement in the axial direction as is permitted by the clearance between the upper surface of flange 30f and cap 22 and by the clearance between the lower end of the movable cylinder and base 12. Those clearances are by design of the parts made such that cylinder 30 will normally not come into contact with either base 12 or cap 22, but will only rotate through an arc about the axis of the movable cylinder.

Figure 2:
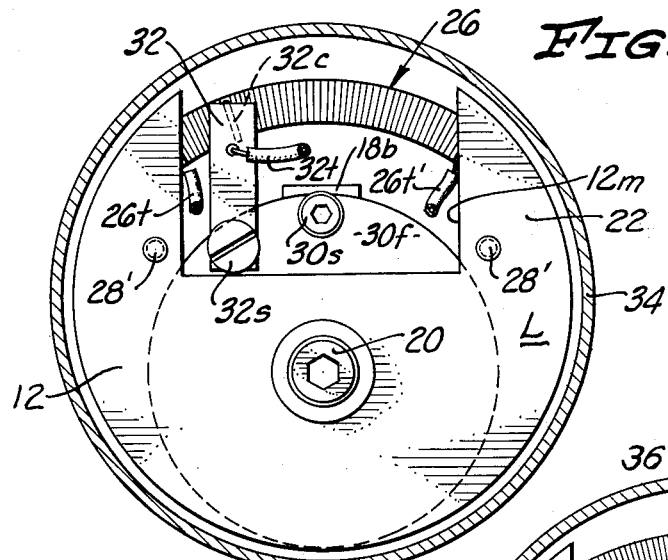
FIGURE 2 is a transverse sectional view of the exemplary instrument, the section having been taken on a plane and in a direction indicated by broken line 2—2 in FIGURE 1.
Figure 3:
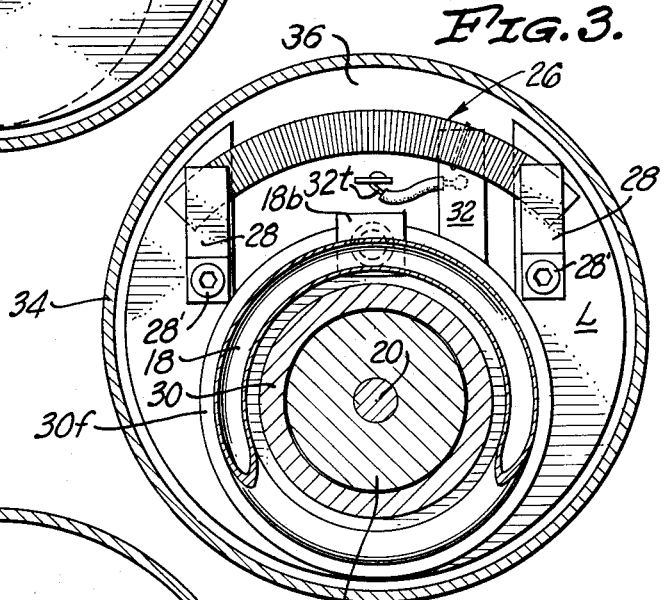
FIGURE 3 is a transverse sectional view of the exemplary instrument, the section having been taken on a plane and in a direction indicated by broken line 3—3 in FIGURE 1.
Figure 4:
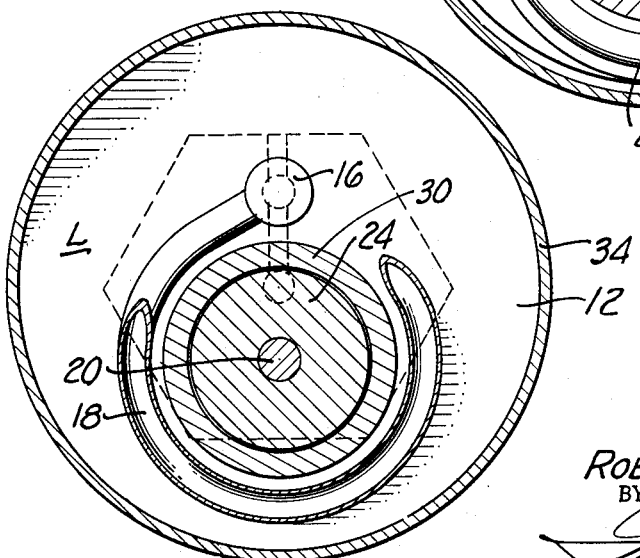
FIGURE 4 is a transverse sectional view of the exemplary instrument, the section having been taken on a plane and in a direction indicated by broken line 4—4 in FIGURE 1.

Secured to the flange 30f, as by means of a screw 32s, is a wiper arm 32 (FIGURE 2). The wiper arm is of resilient material and is insulated from electrical contact with screw 32s and flange 30f either by means of insulative coating or by utilization of an insulation block and spacer between the wiper and the flange and screw. Wiper arm 32 has secured thereto a precious-metal conductive pellet or wiper contact 32c disposed to brush on the exposed contact zone of the resistance element 26 and electrically connected, as by brazing, to the conductor of an insulated contact terminal lead 32t (FIGURE 1). Thus as fluid under pressure is introduced into or exhausted from the Bourdon tube via the pressure fitting, the Bourdon tube is distorted or returns toward a relaxed state and in so doing causes arcuate movement of the free end of the tube and rotation of the movable cylinder and brushing movement of the wiper contact on the resistance element. Thus changes in the fluid pressure differential that may exist between the interior of the tube and the adjacent exterior of the tube are manifested in equivalent changes of the resistance exhibited between the contact terminal lead 32t and either of the resistance element terminal leads.

Rotational movements of the movable cylinder 30 relative to the fixed or stationary cylinder (support) 24 are made substantially frictionless, and vibratory movements of the movable parts or portions of the instrument relative to the stationary parts or portions are damped to any desired predetermined degree or extent, by interposition of a liquid such as a silicone "oil" between the moving and fixed parts. Such liquid is denoted by character L, without other representation in the drawing. So the liquid may be retained in the intended environment, and so the instrument components may be protected, and for other evident reasons, the aforementioned housing comprises a housing member 34 that is sealed at its lower end to the periphery of base 12 and at its upper end to the cover 36 (FIGURE 1) to which the connector C is in turn sealed. Thus an enclosed chamber is provided. The clearance betwen the fixed and movable cylindrical surfaces and the dimensions thereof, and the viscosity and other properties of the liquid, are selected to provide optimum operating characteristics for the particular Bourdon tube and pressure range to be accommodated. The damping effect produced by the thin film of liquid contained between the next-adjacent cylindrical surfaces of the support 24 and the cylinder 30 is brought under as precise control as may be desired for a given set of specified physical characteristics, by providing an annular groove such as 24g (or a series of such grooves) in the middle portion of one of the juxtaposed members 24 and 30, whereby the damping effect of the liquid thereat is decreased. The requisite lengths and depths of such grooves may be found by trial for any set of tube, cylinder and liquid parameters. As illustrated the exemplary groove 24g is formed around the middle portion of the stationary cylinder, support 24.

As may be evident, the relative positions of the fixed and movable members (cylinders) may be reversed as by welding the bottom of the outer cylinder to the base and eliminating bolt 20 with provision, preferably, of stop means to restrict axial movement of the inner cylinder; also, the free end of the Bourdon tube is attached to part of the inner cylinder. Further, whether the drag-regulating or damping-regulating annular groove (24g for example) is on the interior of the outer cylinder or on the exterior of the inner cylinder is obviously optional but is more inexpensively produced as an exterior groove. Also evident are the facts that the bearing structure provided for the Bourdon tube is both less expensive and far less susceptible to significant wear and damage from vibration than were the anti-friction bearings of the prior art helical Bourdon tube potentiometric pressure transducers. The bearing structure is exceptionally rugged and rigid. Additionally, extremely effective and easily regulated damping of spurious motions of the movable portions and parts is provided without significant expense.

The preceding description of a preferred physical embodiment and form of apparatus incorporating the concepts of the invention indicates attainment of the aforementioned objects of the invention. It is evident that the improved structure is both rugged and simple and inexpensive to produce and provides far superior endurance and much improved damping over the pertinent prior art structures. It is evident that in the light of the present disclosure, changes and modifications within the true spirit and scope of the invention will occur to others; and ac-

I claim:

1. A helical Bourdon tube pressure potentiometer comprising:

first means, including housing means providing an enclosed chamber and stationary means providing an elongate rigid member presenting an elongate stationary cylindrical surface disposed around an axis;

second means, including an axially rotatable member presenting a second elongate cylindrical surface concentric with said stationary cylindrical surface and spaced therefrom a small determined extent whereby to provide a rotary bearing relationship between said movable member and said stationary means;

third means, including a helical Bourdon tube having a free end and a fixed end and disposed substantially coaxially with either of said cylindrical surfaces, said third means including means anchoring the fixed end of said Bourdon tube to said housing means and having provision for admission of fluid under pressure into the interior of the Bourdon tube, said third means including means sealing the free end of the Bourdon tube and securing the same to said rotatable member for rotational movement therewith about said axis;

fourth means, including fluid lubricating and damping means substantially immersing said Bourdon tube and disposed between said cylindrical surfaces to lubricate and dampen relative movements therebetween; and fifth means, including potentiometer means comprising a first component affixed to said first means and a rotatable component affixed to said rotatable member to rotate therewith in contact with said first component to provide electrical representations of changes of pressure exhibited by fluid admitted to the Bourdon tube, and terminal means for said potentiometer means.

2. A pressure potentiometer according to claim 1, in which one of said closely spaced cylindrical surfaces is interrupted with an annular groove therearound, of depth and longitudinal extent such as to reduce the damping effect provided by the fluid contained between the two surfaces, to a desired value.

3. A pressure potentiometer according to claim 1, in which said first component of said potentiometer means comprises an arcuate resistance element affixed to said first means and having a contact zone disposed equidistant from said axis, and in which said rotatable component comprises a wiper limb and contact in brushing relationship with the contact zone of said resistance element.

4. A pressure potentiometer according to claim 1, in which said stationary means includes a rigid cylindrical member secured to said housing means, and in which said rotatable member is a tubular cylindrical member encircling at least a portion of said rigid cylindrical member and coaxial therewith.

5. A pressure potentiometer according to claim 4, in which said Bourdon tube encircles both of said rigid cylindrical member and said tubular cylindrical member.

6. A helical Bourdon tube transducer comprising:

stationary means, including housing means forming an enclosed chamber for housing the operating components of the transducer, said stationary means comprising means presenting an elongate stationary cylindrical surface disposed about an axis;

rotatable means, including a rotatable member having an elongate cylindrical surface coaxial with said stationary cylindrical surface and disposed very close to the latter whereby to utilize the latter as a bearing surface;

Bourdon tube means, including a helical Bourdon tube encircling said axis and having a fixed end attached to said stationary means to be held against rotation and a closed free end secured to said rotatable member to rotate the member incident to change of pressure within the tube, with provisions for admission of fluid under pressure into the tube;

liquid means, including liquid in said enclosed chamber, disposed in part between said cylindrical surfaces and there serving to lubricate and dampen relative motion therebetween and disposed in part in immersing relation to said Bourdon tube to dampen movements thereof; and first and second electrical components, the first mounted on said stationary means and the second mounted on said rotatable means to be moved thereby relative to the first thereof to produce an electrical indication of the extent of such movement to provide an indication of the change of pressure in said Bourdon tube.

7. A transducer according to claim 6, in which said first electrical component is a resistance element having an arcuate exposed contact zone, and in which said second electrical component is a wiper and contact in brushing engagement with said exposed contact zone.

References Cited in the file of this patent

UNITED STATES PATENTS

| | | |
|---|---|---|
| 2,976,506 | Bourns | Mar. 21, 1961 |
| 3,113,233 | Bourns | Dec. 12, 1961 |
| 3,126,519 | Burley | Mar. 24, 1964 |